US009727200B2

(12) United States Patent
Lee (10) Patent No.: US 9,727,200 B2
(45) Date of Patent: Aug. 8, 2017

(54) METHOD AND SYSTEM FOR DISPLAYING GRAPHIC USER INTERFACE

(71) Applicant: Samsung Electronics Co., Ltd., Gyeonggi-do (KR)

(72) Inventor: Seungmyung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 658 days.

(21) Appl. No.: 13/916,900

(22) Filed: Jun. 13, 2013

(65) Prior Publication Data

US 2014/0047362 A1   Feb. 13, 2014

(30) Foreign Application Priority Data

Aug. 10, 2012   (KR) .................. 10-2012-0087704

(51) Int. Cl.
```
G06F 3/048    (2013.01)
G06T 11/00    (2006.01)
G09G 5/00     (2006.01)
G09G 5/02     (2006.01)
```
(52) U.S. Cl.
CPC ............ *G06F 3/048* (2013.01); *G06T 11/001* (2013.01); *G09G 5/00* (2013.01); *G09G 5/024* (2013.01)

(58) Field of Classification Search
CPC ..... H04N 1/4413; G03G 15/502; G06Q 30/06
See application file for complete search history.

(56) References Cited

U.S. PATENT DOCUMENTS

| | | | |
|---|---|---|---|
| 9,313,160 B1 * | 4/2016 | Shamis | H04L 51/16 |
| 2004/0070619 A1 * | 4/2004 | Yoshio et al. | 345/764 |
| 2006/0215987 A1 * | 9/2006 | Horentrup et al. | 386/83 |
| 2007/0216811 A1 | 9/2007 | Oh et al. | |
| 2009/0089710 A1 | 4/2009 | Wood et al. | |
| 2009/0196523 A1 * | 8/2009 | Choi et al. | 382/255 |
| 2010/0088654 A1 | 4/2010 | Henhoeffer | |
| 2010/0257469 A1 | 10/2010 | Kim et al. | |
| 2011/0145742 A1 * | 6/2011 | Chaudhri | 715/765 |
| 2011/0170008 A1 | 7/2011 | Koch | |

FOREIGN PATENT DOCUMENTS

JP   3297410 B2   7/2002

* cited by examiner

*Primary Examiner* — Di Xiao
(74) *Attorney, Agent, or Firm* — Cha & Reiter, LLC.

(57) ABSTRACT

An apparatus and method for displaying graphic user interface (GUI) in a variety of states includes combining effect images and chroma key layers to which color codes are applied in multi-layers. More specifically, the GUI display method includes: loading a chroma key image of a certain shape for a GUI; applying a color code corresponding to the GUI to the chroma key image; creating a GUI image by combining an effect image corresponding to the GUI with the chroma key image to which the color code is applied; and displaying the GUI image.

20 Claims, 12 Drawing Sheets

METHOD AND SYSTEM FOR DISPLAYING GRAPHIC USER INTERFACE

CLAIM OF PRIORITY

This application claims the benefit under 35 U.S.C. §119 (a) of a Korean patent application filed on Aug. 10, 2012 in the Korean Intellectual Property Office and assigned Serial No. 10-2012-0087704, the entire disclosure of which is hereby incorporated by reference.

BACKGROUND

1. Field of the Invention

The present disclosure relates to a system and method that displays graphic user interface (GUI) in a variety of states by combining image effect to enhance user experience.

2. Description of the Related Art

With the development of technology in the field of computers, various types of interfaces have been developed to easy users' experiences in using computers. Today, many electronic devices are implemented with a touch screen to provide a graphic user interface (GUI) in lieu of keyboards. GUIs include various types of menus and images, e.g., windows, scroll bars, icons, control buttons, etc., compared to the traditional DOS command interfaces.

In recent years, attempts have been made to represent the states of GUIs, e.g., a normal state, a clicked state, a selected state, an enabled state, and a disenabled state, in a variety of ways to meet the demand for more attractive GUIs. For example, conventional electronic devices store images corresponding to the states of respective GUIs in a memory for display the respective state of a GUI during operation.

However, the conventional GUI display methods are disadvantageous in that the limited memory capacity is unnecessarily wasted with GUI images, thus reducing the memory capacity and deteriorates the performance of the electronic devices. Conventional GUI display methods also require too many image sources which in turn make it difficult to operate and manage GUIs.

SUMMARY

The invention has been made in view of the above problems and provides additional advantages, by providing a graphic user interface (GUI) display system and method for providing a variety of color effects which is achieved by applying color codes corresponding to GUI to chroma key images.

The invention further provides a GUI display system and method for providing texture or cubic effects by applying effect images corresponding to GUI states to chroma key images.

In accordance with an exemplary embodiment of the invention, a graphic user interface (GUI) display method includes: loading a chroma key image of a certain shape for a GUI; applying a color code corresponding to the GUI to the chroma key image; creating a GUI image by combining an effect image corresponding to the GUI with the chroma key image to which the color code is applied; and displaying the GUI image.

In accordance with another exemplary embodiment of the invention, a graphic user interface (GUI) display system includes: a display unit for displaying one or more GUIs; and a controller for: loading a chroma key image of a certain shape for the GUI; applying a color code corresponding to the GUI to the chroma key image; creating a GUI image by combining an effect image corresponding to the GUI with the chroma key image to which the color code is applied; and controlling the display unit to display the GUI image.

BRIEF DESCRIPTION OF THE DRAWINGS

The above features and advantages of the invention will become more apparent from the following detailed description viewed in conjunction with the accompanying drawings, in which.

DETAILED DESCRIPTION

In the following description, although embodiments of the invention are explained based on an electronic device equipped with a GUI display function, it should be understood that the invention is not limited to the embodiments. It will be appreciated that the invention can be applied to all information communication devices, multimedia devices, and their applications, when they are equipped with a memo function, for example, smart phones, portable terminals, mobile communication terminals, Personal Digital Assistants (PDAs), Portable Multimedia Players (PMPs), computers, laptop computers, note pad devices, Wibro terminals, tablet PC, smart TVs, smart refrigerators, etc.

The terms or words described in the present description and the claims should not be limited by a general or lexical meaning, instead should be analyzed as a meaning and a concept through which the inventor defines and describes the invention to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

As used herein, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention are described in detail with reference to the accompanying drawings.

Figure 1:
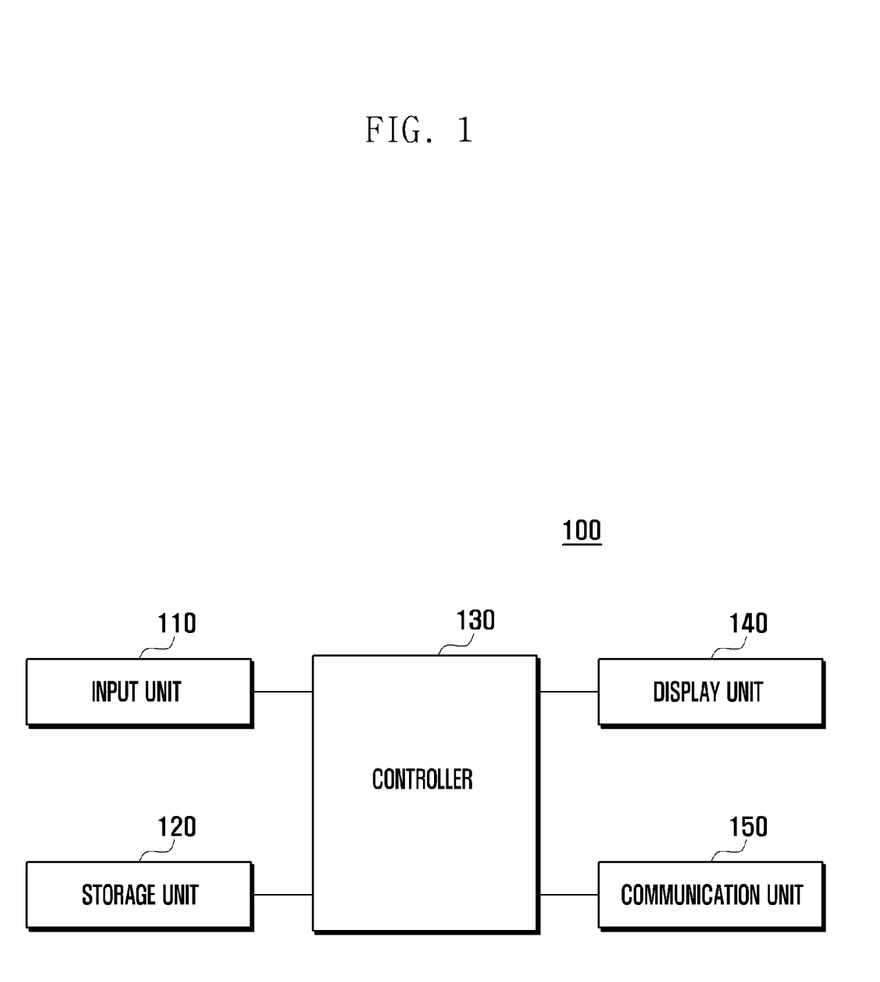
FIG. 1 illustrates a schematic block diagram of a GUI display system according to an embodiment of the invention.

FIG. 1 illustrates a schematic block diagram of a GUI display system according to an embodiment of the invention.

Referring to FIG. 1, the GUI display system 100 includes an input unit 110, a storage unit 120, a controller 130, and a display unit 140.

In operation, the input unit 110 creates control signals according to the user's inputs. The input unit 110 may be implemented with a keypad, a dome switch, a jog wheel, a jog switch, etc. The input unit 110 may include a touch sensor, a pressure sensor, a proximity sensor, an electromagnetic sensor, etc. Alternatively, the input unit 110 may also be implemented with various types of pads, e.g., a touch pad (of resistive/capacitive type), Electro Magnetic Resonance (EMR) pad, Electro Magnetic Interface (EMI) pad, etc. The input unit 110 senses, via sensors, user's inputs using a variety of objects, such as the user's body (e.g., hand), a physical tool (e.g., a stylus pen), etc. Further, the input unit 110 may be configured with a number of pads that are multi-layered. Alternatively, the input unit 110 and the display unit 140 may be configured in a layered structure, i.e., a touch screen.

The input unit 110 senses a user's input applied to one or more GUIs. Examples of the user's input are a press gesture, a drag gesture, a flick gesture, etc. In addition, the input unit 110 can also sense multi-points input by a number of input tools or touches.

The storage unit 120 stores commands or programs related to the GUI display system 100. The controller 130 executes the commands and the commands stored in the storage unit 120.

The storage unit 120 may be implemented with a flash memory type, a hard disk type, a multimedia card micro type, a card type of memory (e.g., SD, XD, etc.), a Random Access Memory (RAM), a Static Random Access Memory (SRAN), a Read-Only Memory (ROM), Electrically Erase Programmable Read-Only Memory (EEPROM), a Programmable Read-Only Memory (PROM), a magnetic memory, a magnetic disk, an optical disk, etc.

In an embodiment of the invention, the storage unit 120 stores one or more GUIs and/or images to create GUIs. The storage unit 120 also stores effect images, color codes, chroma key images corresponding to GUIs, etc. The storage unit 120 also stores information regarding GUIs corresponding to user's inputs, or the operations, functions, and states of the GUI display system 100. The storage unit 120 may temporarily or permanently store GUIs created by the controller 130.

The controller 130 controls the entire operation of the GUI display system 100. For example, the controller 130 controls the components to display GUIs on the GUI display system 100.

The controller 130 performs the control operations to display GUIs corresponding to user's inputs, or the operations, functions, and states of the GUI display system 100. The controller 130 loads a chroma key image of a certain shape or form for GUI, and applies a color code corresponding to the GUI to the chroma key image. That is, the controller 130 applies a color code to a chroma key image, where the color code refers to a code according to one of an RGB value, a hex code, and a color value of a palette provided by a mobile device, corresponding to a state, type, etc., of a GUI.

The controller 130 combines an effect image corresponding to a GUI with a chroma key image. The effect image may be an effect corresponding to a state of the GUI, including at least one of a normal state, a clicked state, a selected state, an enabled state, and a disenabled state. In addition, the effect image may correspond to at least one of a texture effect or a cubic effect according to shadow.

The controller 130 controls the display unit 140 to display a GUI image that is created on a chroma key image by applying a color code thereto. The controller 130 can control the display unit 140 to display GUIs, by successively altering the color code or effect image according to time, use frequency, preference, importance, etc. or according to a user's input. A detailed operation of the controller 130 will be provided later referring to the accompanying drawings.

The display unit 140 displays information processed in the GUI display system 100. For example, the display unit 140 displays user interface (UI) or graphic user interface (GUI) related to the control operations of the GUI display system 100.

The display unit 140 may be implemented with a flat display panel, such as a Liquid Crystal Display (LCD), a Thin Film Transistor-liquid crystal display (TFT LCD), Organic Light Emitting Diodes (OLEDs), a flexible display, a three-dimensional (3D) display, or the like.

The display unit 140 may be configured with the touch sensors to serve as a touch screen. That is, the display unit 140 may be implemented with a display panel combined with touch sensors, e.g., a TSP panel. Here, the display unit 140 of a touch screen also serves as an input device.

The display unit 140 can display one or more GUIs. The display unit 140 can also display GUI images created under the control of the controller 130. In addition, the display unit 140 can also display GUI images by successively altering the colors under the control of the controller 130.

In another embodiment, the GUI display system 100 may further include a communication unit 150. The communication unit 150 performs data communication with external systems, in a wired mode or a wireless mode such as RF communication or short-range communication, for example. RF communication may be Wireless LAN (WLAN), Wi-Fi, Wireless broadband (Wibro), World Interoperability for Microwave Access (Wimax), High Speed Downlink Packet Access (HSDPA), etc. Short-range RF communication may be Bluetooth, Radio Frequency Identification (RFID0, Infrared Data Association (IrDA), Ultra Wideband (UWB), Zigbee, etc. Wired short range communication may be Universal Serial Bus (USB), IEEE 1394, Thunderbolt™ of Intel, etc. The communication unit 150 may include one or more communication modules for Bluetooth, Zigbee, UWB, Wireless USB, Near Field Communication (NFC), Wireless LAN, etc.

In an embodiment of the invention, the communication unit 150 receives a chroma key image for GUI, an effect image, a previously created GUI image, etc. from the external systems. In addition, the communication unit 150 may receive a color code according to an RGB value and a hex code from the external system or a palette including values for one or more colors.

It should be understood that the GUI display system 100 shown in FIG. 1 may further include other components or omit some parts of them according to the necessary functions desired in the system.

Figure 2:
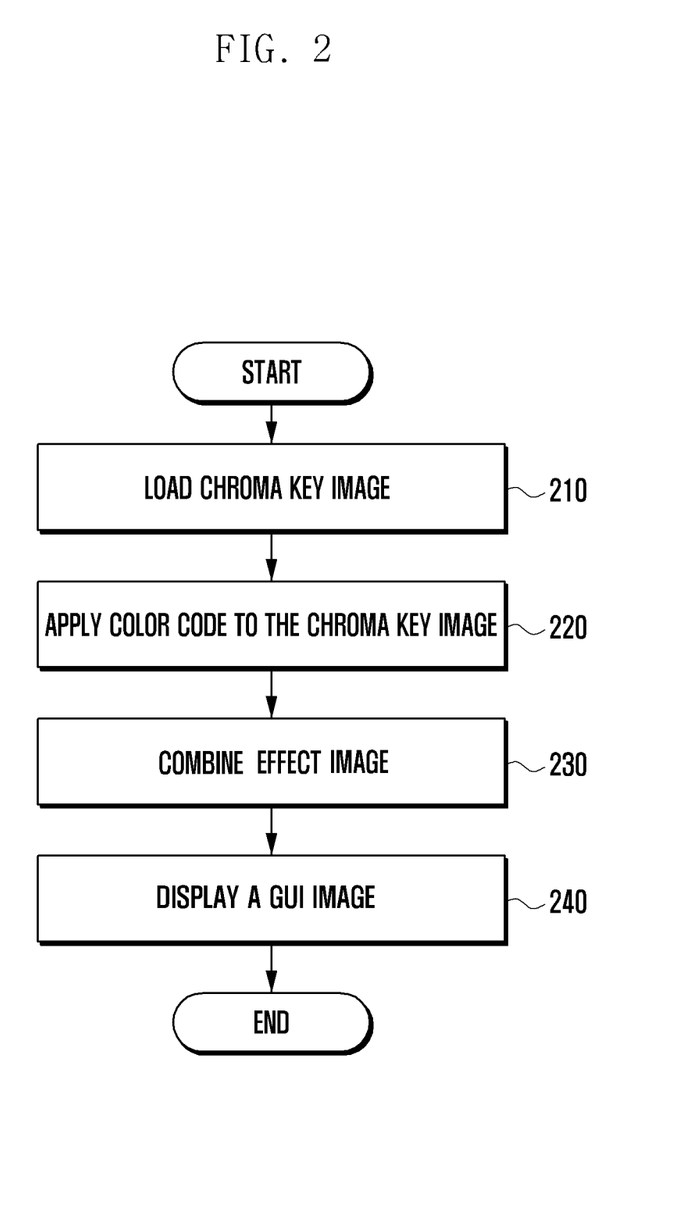
FIG. 2 illustrates a flow chart that describes a method for displaying a GUI according to an embodiment of the invention.

FIG. 2 illustrates a flow chart that describes a method for displaying a GUI according to an embodiment of the invention.

Referring to FIG. 2, the GUI display system 100 loads a chroma key image (210). The chroma key image has a certain shape for a GUI. Examples of a GUI are a dial image, a keyboard, an icon, a control button, a scroll bar or an indicator bar.

Figure 3:
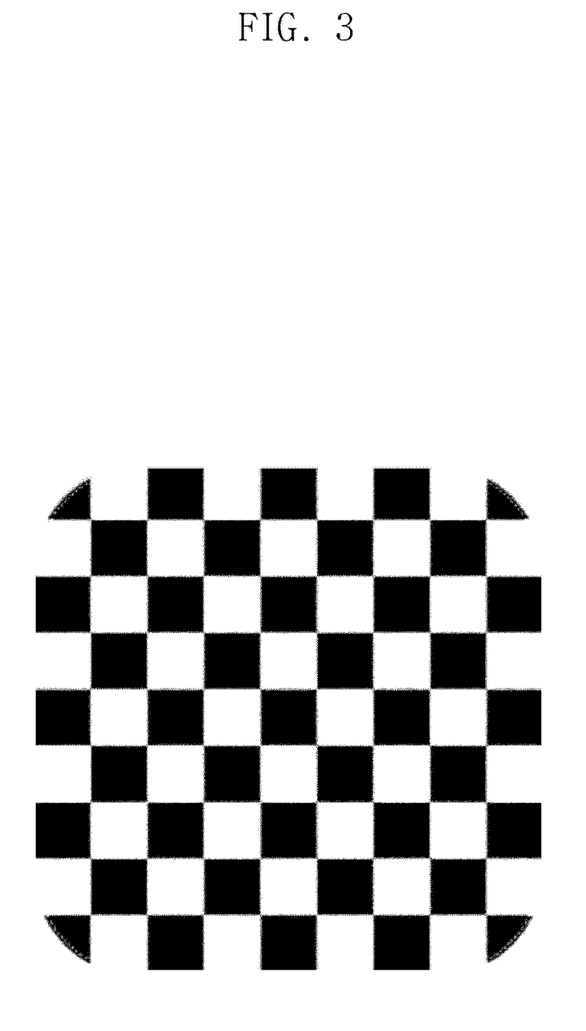
FIG. 3 illustrates a chroma key image according to an embodiment of the invention.

Chroma keying refers to a technique that combines two images so that a first image is superimposed on a second image based on color hues, where the second image serves as a chroma key image, i.e., a background image. Chroma key images may have in general colors complementary to those of images to be combined (superimposed), and alternatively patterns, e.g., a check pattern as shown in FIG. 3.

In an embodiment of the invention, the chroma key image serves as a background layer to create GUI images, and is removed after GUI images are created.

The GUI display system 100 loads a chroma key image layer of a certain shape in order to create a GUI image. It is preferable that a chroma key image is shaped to correspond to the shape of GUI image. For example, if a GUI image is shaped as a curved rectangle, the chroma key image may be designed in the same shape as the GUI image as shown in FIG. 3.

The chroma key image is stored in the GUI display system 100. Alternatively, the GUI display system 100 may download chroma key images from other devices or servers, in data communication, via the applications, software programs, services, etc.

After loading a chroma key image at step 210, the GUI display system 100 applies a color code corresponding to the GUI to the chroma key image (220). The color code may be RGB values, a hex code, or a code corresponding to one of the colors of a palette provided by the GUI display system 100. For example, the color code may be a code made up of RGB values, e.g., (17, 133, 194), (228, 73, 0), etc. Alternatively, the color code may be a hex code, e.g., #415227, #5fa8dc, #383838, etc. The GUI display system 100 may apply a color code corresponding to a GUI to a chroma key image. If a GUI needs to be created in black, the GUI display system 100 applies RGB values (0, 0, 0) or a hex code (#000000) to the chroma key image.

Figure 4:
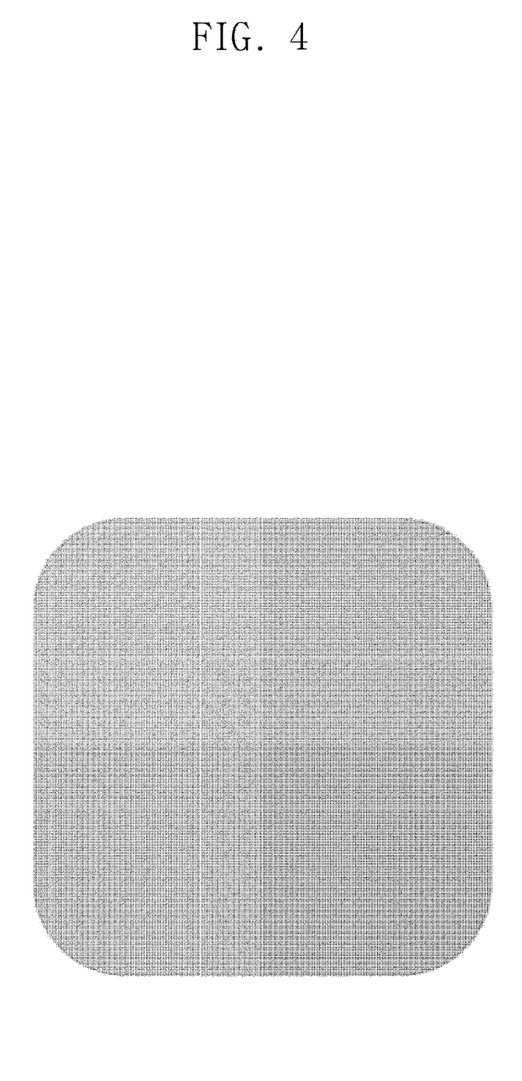
FIG. 4 illustrates a chroma key image to which a color code is applied, according to an embodiment of the invention.

FIG. 4 illustrates a chroma key image to which a color code is applied according to an embodiment of the invention. That is, the GUI display system 100 applies a color code corresponding to the GUI to the chroma key image, thereby creating the chroma key image colored to correspond to the GUI.

The GUI display system 100 may successively alter color codes and apply them to the chroma key image. In order to provide the color alteration effect to the GUI, the GUI display system 100 may successively alter color codes according to time interval, event, or user's inputs, and apply them to the chroma key image. The GUI display system 100 displays GUI images based on the chroma key images to which the successively altered color codes are applied, so that the user can view the GUIs with a variety of visual effects according to colors during operation. For example, the GUI display system 100 may provide a GUI with a visual effect, fading from a first color to a second color. To this end, the GUI display system 100 may seamlessly and successively change from a color code corresponding to the first color to one that corresponds to the second color, in an interval that is imperceptible to the human eye. In addition, the GUI display system 100 may successively alter color codes corresponding to a first or second color by turns, thereby providing a GUI in a flickering effect.

After applying a color code to the chroma key image at step 220, the GUI display system 100 combines an effect image corresponding to the GUI with the color code applied chroma key image (230).

The effect image may corresponds to a state of the GUI, including at least one of a normal state, a pressed state, a selected state, a highlighted state, an active state, and an inactive state. In addition, the effect image may correspond to at least one of a texture effect or a cubic effect according to shadow. The image with an effect may be shaped to correspond to the shape of GUI.

Figure 5:
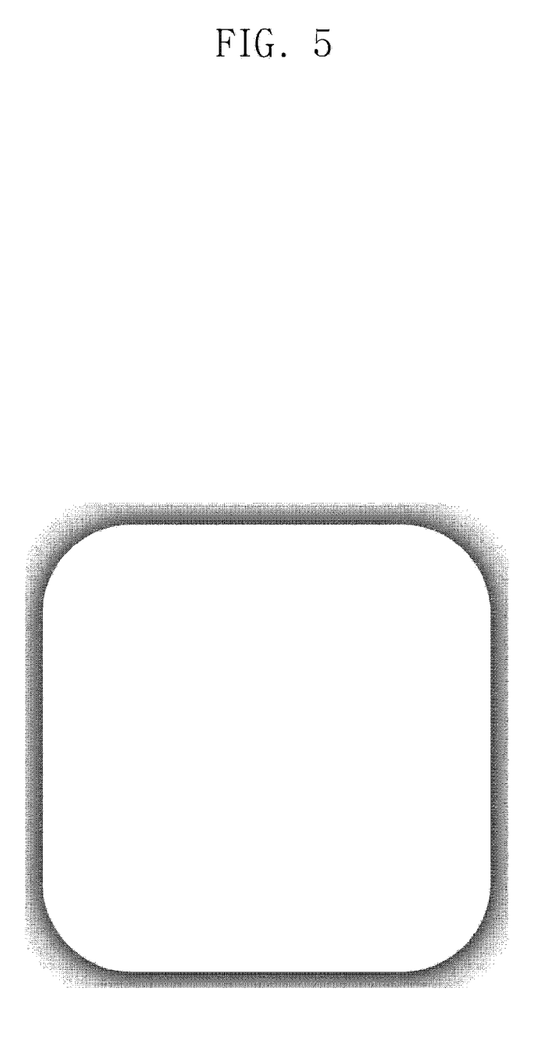
FIG. 5 illustrates an image with an effect corresponding to a normal state, according to an embodiment of the invention.

Referring to FIG. 5, the effect image is created to represent a normal state of a GUI, and is implemented as a protruded cubic effect in such a way that shadow gradually becomes darker from the edge of the image in the outside direction. The normal state refers to a state where the user can control the GUI display system 100 via GUIs.

Figure 6:
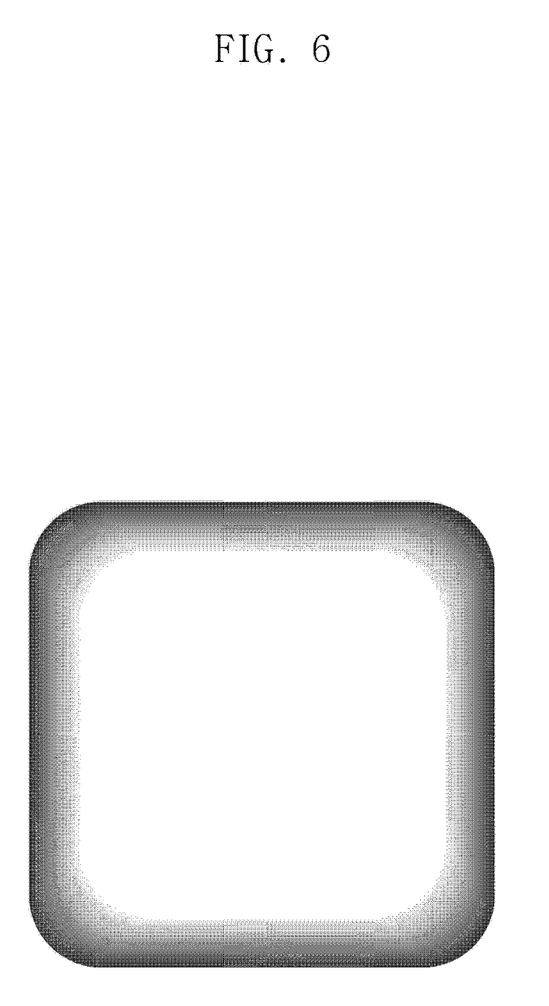
FIG. 6 illustrates an image with an effect corresponding to a pressed or selected state according to an embodiment of the invention.

Referring to FIG. 6, the effect image is created to represent a pressed or selected state of a GUI, and is implemented as a depressed cubic effect shown in such a way that the shadow gradually becomes brighter from the edge of the image towards the center direction. The pressed or selected state refers to a state where the user presses or selects a GUI.

Figure 7:
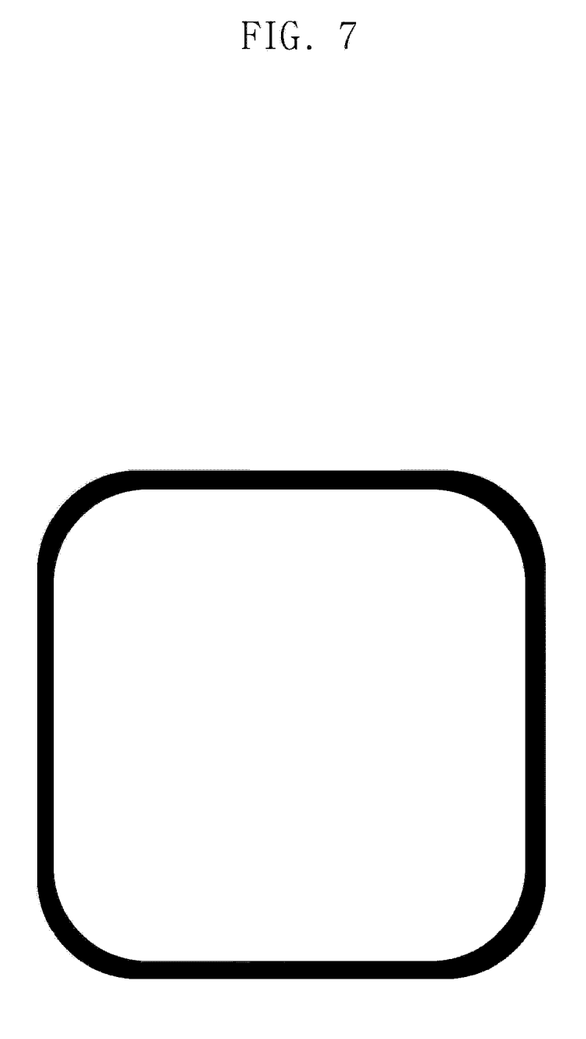
FIG. 7 illustrates an image with an effect corresponding to an enabled or highlighted state according to an embodiment of the invention.

Referring to FIG. 7, the effect image is created to represent a state where a GUI is selected, highlighted, or activated, and is implemented in such a way that the edge of the image is highlighted. The selected state or highlighted state refers to a state where a GUI is selected via a user's input. The activated state refers to a state where a service, a program or an application corresponding to a GUI is executed via the selection of the GUI, etc.

Figure 8:
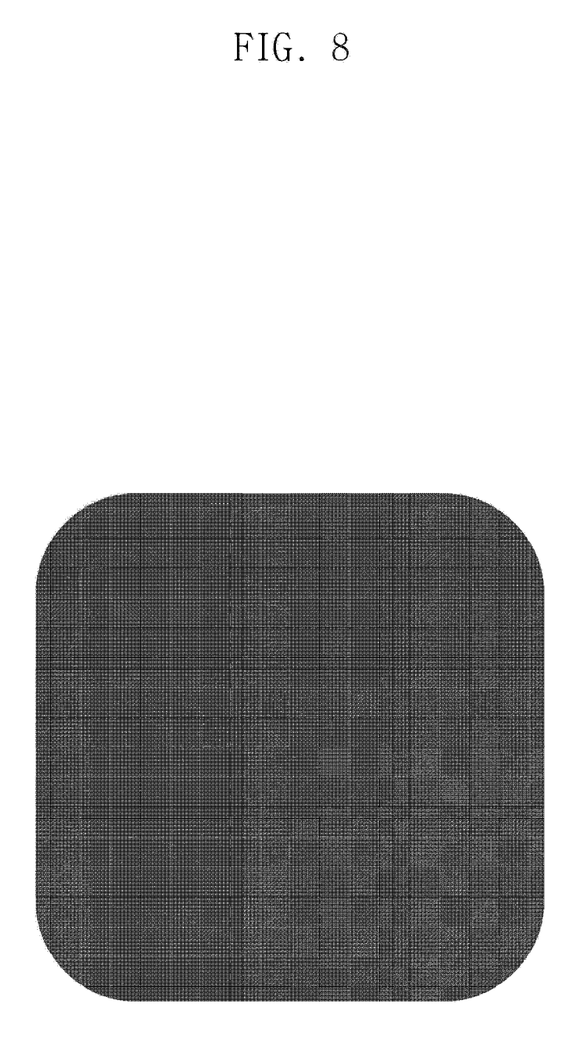
FIG. 8 illustrates an image with an effect corresponding to a disenabled state according to an embodiment of the invention.

Referring to FIG. 8, the effect image is created to represent a state where a GUI is inactivated, and is implemented in such a way that the entire area of the GUI image is thinly shaded. The inactivated state refers to a state where a GUI cannot be selected via a user's input, or a state where a service, program or application corresponding to a GUI cannot be executed.

The areas without textures or shades in the images of effects as shown in FIGS. 5 to 8 may be transparent so that a color corresponding to a color code of a chroma key image can be shown when the areas are combined with the chroma key image. That is, like the chroma key image, the areas are removed when the GUI image is created.

Although the embodiments are described based on the state of a corresponding GUI, and the texture, shadow shape, form, and applicable area of effect images, it should be understood that the invention is not limited to the embodiments.

The images with effects are stored in the GUI display system 100. Alternatively, the GUI display system 100 may download the images from other devices or servers, in data communication, via the applications, software programs, services, etc.

Figure 9:
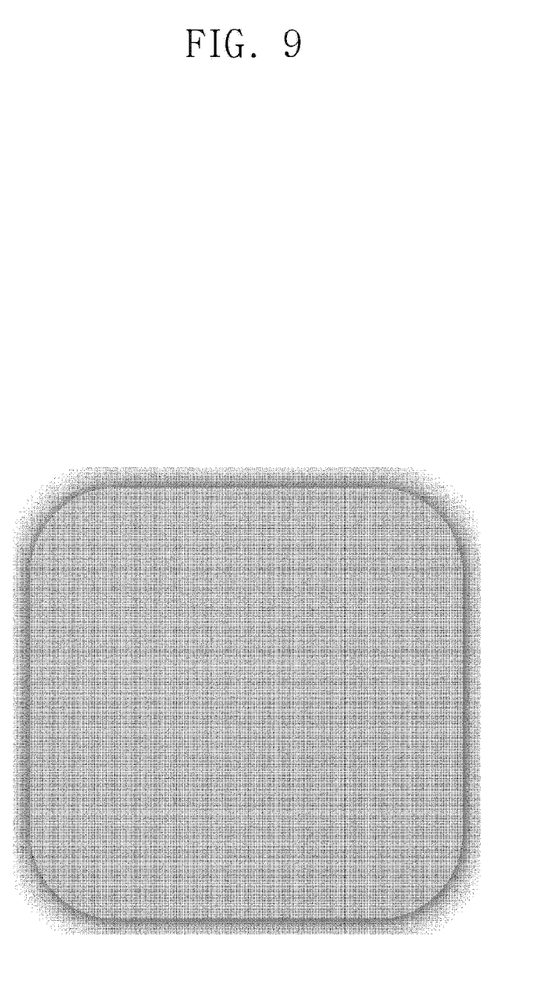
FIG. 9 illustrates a created GUI image according to an embodiment of the invention.

The GUI display system 100 combines an effect image with a chroma key image in such a way that the effect image layer is placed on the chroma key image layer, thereby creating the GUI image. For example, as shown in FIG. 9, the GUI display system 100 can create a GUI image where an effect image corresponding to a normal state, representing a shadow of a protrudent cubic effect, is combined on a chroma key image to which a black color code is applied.

As such, since the GUI display system 100 can create a GUI image by combining layers of a few effect images according to the states of GUI and the color codes with a layer containing a small amount of the chroma key image, it can prevent the drawbacks associated with wasting the storage space as in the prior art. In addition, since the GUI display system 100 alters effect images and/or color codes applied to a chroma key image in order to represent GUIs according to the states, without loading new GUI images each time as in the prior art when it needs to alter the states of GUIs, thus it can enhance the speed of implementing GUIs.

Figure 10:
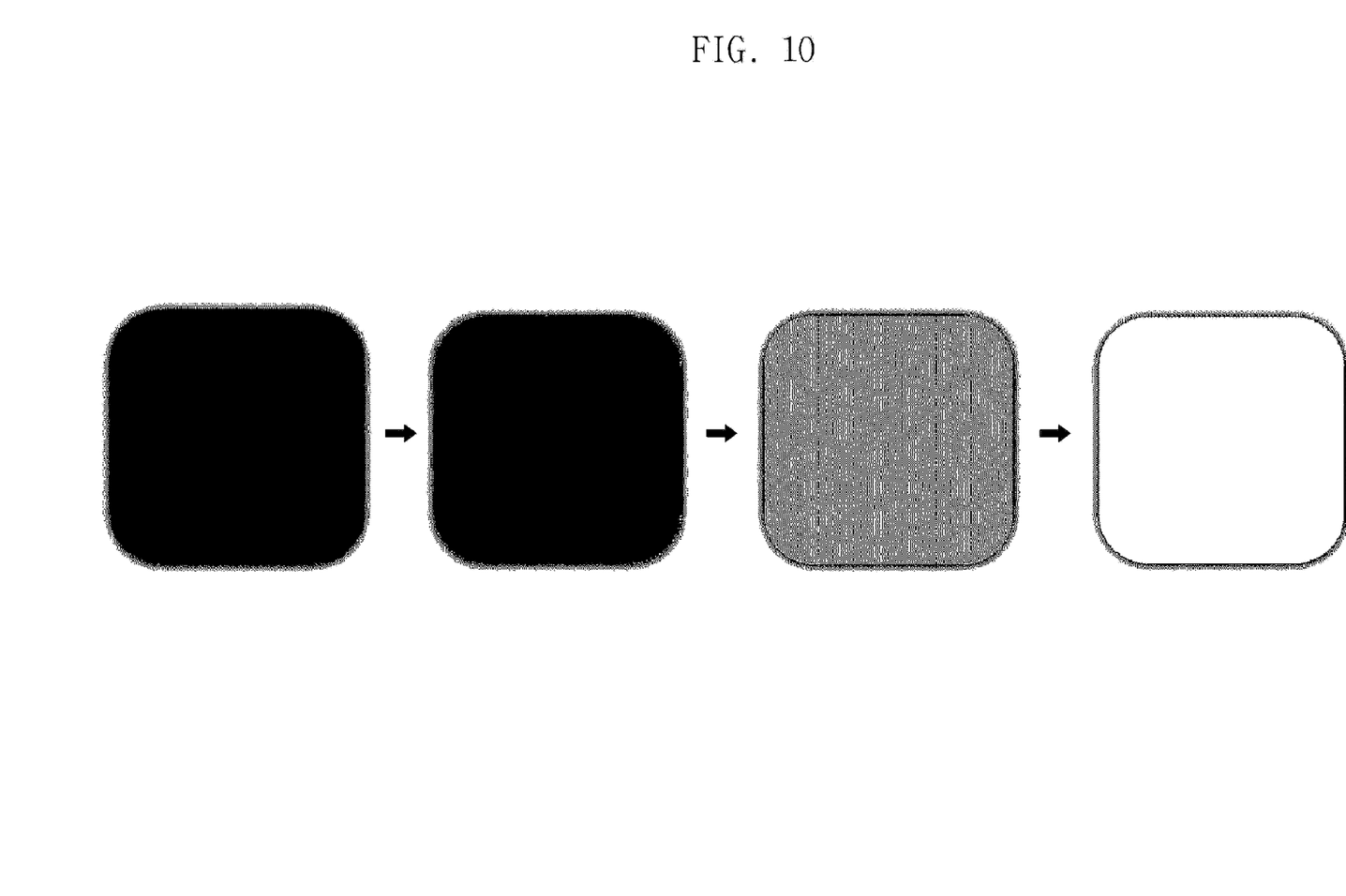
FIG. 10 illustrates views that describe a method for successively altering a color code, according to an embodiment of the invention.

When the GUI display system 100 provides visual effects according to colors to a GUI, it can alter corresponding color codes in the created GUI image and display it, without loading all of the GUI images corresponding to the respective colors, thereby efficiently providing a variety of visual effects to the GUI. For example, as shown in FIG. 10, the GUI display system 100 can provide visual effects where the colors of a GUI image corresponding to a normal state are varied according to time elapsing or a user's inputs. The GUI display system 100 can successively alter color codes and apply them to a chroma key image configuring a GUI image. The GUI display system 100 can create a GUI image, based on a chroma key image to which successively altered color codes are applied, and display it. Therefore, the GUI display system 100 can provide a GUI with a variety of visual effects according to colors, by altering the color codes. Referring to FIG. 10, the GUI display system 100 provides a GUI with visual effects where a first color fades to a second color. To this end, the GUI display system 100 seamlessly, successively change from a color code that corresponds to the first color to one that corresponds to the second color, in an interval that is imperceptible to the human eye.

The embodiment may be modified in such a way that the GUI display system 100 first combines an effect image with a chroma key image and then applies color codes to the combined, created image. For example, in order to provide a GUI image, combined with an effect image, with visual effects according to color alteration, the GUI display system 100 may apply a color code to the chroma key image.

Referring back to FIG. 2, after combining an effect image corresponding to the GUI with the chroma key image to which a color code is applied at step 230, the GUI display system 100 displays the created GUI image (240).

The GUI display system 100 can successively alter color codes for the displayed GUI image, and apply them to the chroma key image configuring the GUI image. In addition, the GUI display system 100 can also display a GUI image based on successively altered color codes, thereby providing it with a variety of visual effects.

Figure 11:
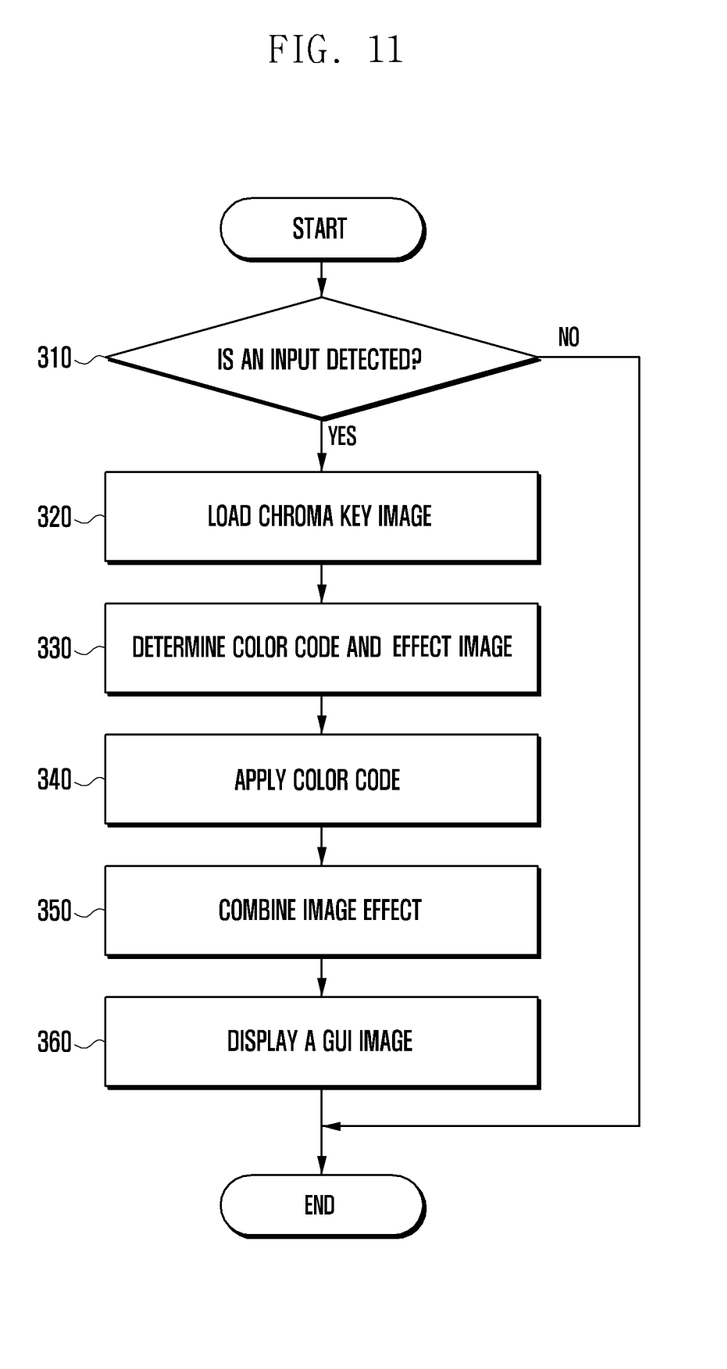
FIG. 11 illustrates a flow chart that describes a method for displaying a GUI corresponding to an input, according to an embodiment of the invention.

FIG. 11 illustrates a flow chart that describes a method for displaying a GUI corresponding to an input, according to an embodiment of the invention.

Figure 12:
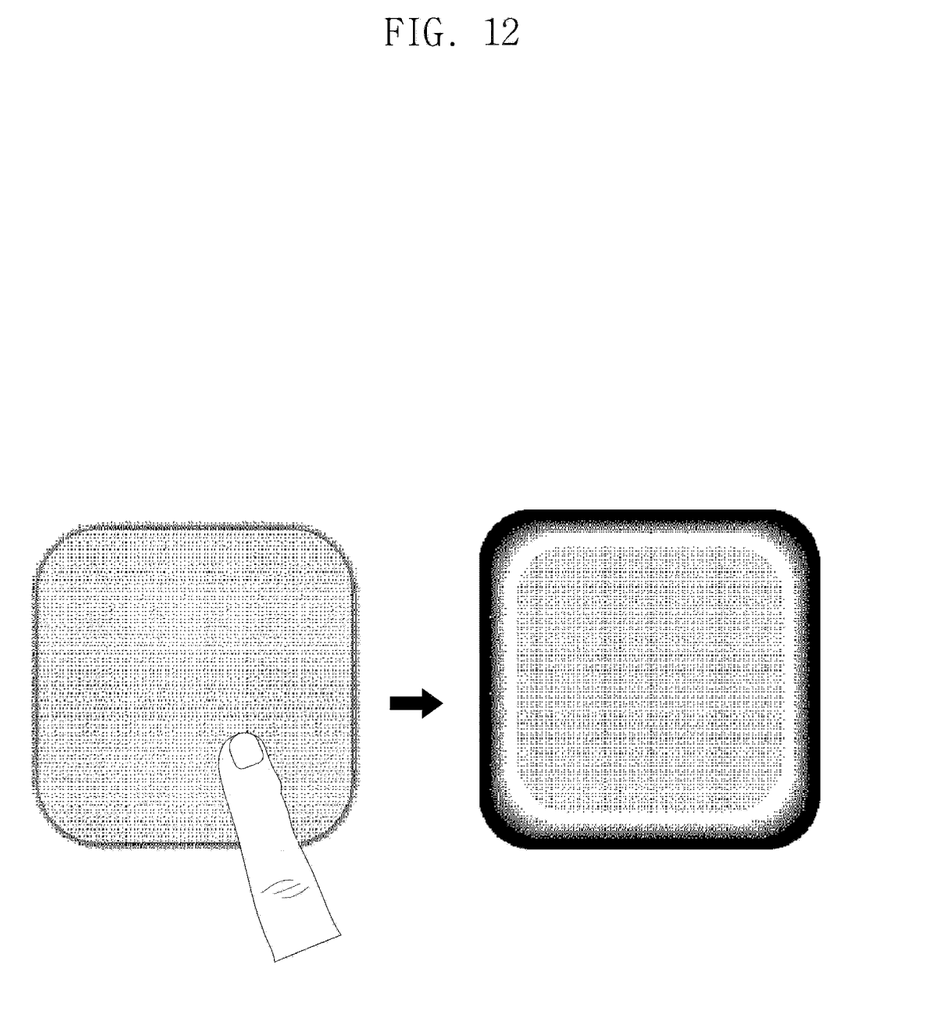
FIG. 12 illustrates views that describe a method for displaying a GUI according to an input.

The GUI display system 100 determines whether a user's input applies to a GUI, i.e., a GUI image created and displayed according to the invention (310). Examples of the user's input are a touch input, a proximity input, a hovering input, a press input, etc. The user's input serves to alter the states of a GUI. For example, as shown in FIG. 12, a normal state of a GUI is altered to a pressed state according to a user's input. In addition, the user's input also alters the state of a GUI and simultaneously executes an application, a software program, or a corresponding service, corresponding to the GUI.

When the GUI display system 100 ascertains that a user's input applies to a GUI at step 310, it loads the corresponding chroma key image (320).

The GUI display system 100 determines a GUI corresponding to the user's input. Since the GUI display system 100 stores information regarding GUIs corresponding to various types of inputs respectively, if it detects a user's input to a GUI, it can search for information regarding the GUI according to the detected input. If the GUI displays system 100 searches for the GUI information, it can determine the GUI corresponding to the detected input, based on the searched GUI information. In addition, the GUI display system 100 can load a chroma key image for the determined GUI.

Examples of the GUI are a dial image, a keyboard, an icon, a control button, a scroll bar or an indicator bar. The chroma key may be shaped to correspond to the shape of GUI image. For example, if a GUI image is shaped as a curved rectangle, the chroma key image may be designed in the same shape as the GUI image as shown in FIG. 3.

The chroma key image is stored in the GUI display system 100. The GUI display system 100 may download chroma key images from other devices or servers, in data communication, via the applications, software programs, services, etc.

If the GUI display system 100 detects a user's input to a GUI image that has been displayed, it may not perform a process for loading a chroma key image. In that case, the GUI display system 100 may modify a GUI image, based on the same chroma key image as the GUI image that has been displayed.

After loading a chroma key image at step 320, the GUI display system 100 determines a color code and/or an effect image according to an input (330). For example, if the GUI display system 100 detects an input for altering a normal state of a GUI to a pressed state, it determines an effect image to display an image corresponding to the pressed state. In addition, if the GUI display system 100 detects an input termination for returning a pressed state of a GUI to a normal state, it may alter a color code that corresponds to a first color of the GUI to one that corresponds to a second color.

After determining a color code and/or an effect image according to an input at step 330, the GUI display system 100 applies the determined color code to a chroma key image (340). The color code may be RGB values, a hex code, or a code corresponding to one of the colors of a palette provided by the GUI display system 100. For example, the color code may be a code made up of RGB values, e.g., (17, 133, 194), (228, 73, 0), etc. Alternatively, the color code may be a hex code, e.g., #415227, #5fa8dc, #383838, etc. The GUI display system 100 may apply the determined color code to a chroma key image. If a determined color code corresponds to a black color, the GUI display system 100 applies RGB values (0, 0, 0) or a hex code (#000000) to the chroma key image.

If the GUI display system 100 detects an input to a GUI that has been displayed, it may apply the determined color code to a chroma key image configuring the displayed GUI.

After applying the color code to the image at step 340, the GUI display system 100 combines the determined effect image with the chroma key image to which the color code is applied (350).

The effect image may corresponds to a state of the GUI, including at least one of a normal state, a pressed state, a selected state, a highlighted state, an active state, and an inactive state. In addition, the effect image may correspond to at least one of a texture effect or a cubic effect according to shadow. The image with an effect may be shaped corresponding to the shape of GUI.

The GUI display system 100 combines an effect image with a chroma key image in such a way that the effect image layer is placed on the chroma key image layer, thereby creating the GUI image.

If the GUI display system 100 detects an input for a GUI that has been displayed, it alters the effect image configuring the displayed GUI, via the determined effect image. For example, referring to FIG. 12, if the GUI display system 100 detects a user's input to a GUI in a normal state that has been displayed, it alters the effect image corresponding to the normal state to that of a pressed state.

After combining the determined effect image with the chroma key image at step 350, the GUI display system 100 displays the GUI image created according to the input (360).

The GUI display system 100 varies the effect image according to the state or the color of the GUI image and displays it, thereby providing the GUI with a variety of effects according to the user's input. For example, as shown in FIG. 12, if the GUI display system 100 detects a user's input pressing the displayed GUI image, it alters the effect image corresponding to the normal state of the GUI to an effect image corresponding to the pressed state. Alternatively, the GUI display system 100 varies the color code of the GUI image, thereby providing a GUI with a visual effect corresponding to the user's input. In addition, if the GUI display system 100 detects an input termination for returning a pressed state of a GUI to a normal state, it may alter a color code that corresponds to a first color of the displayed GUI to one that corresponds to a second color, thereby providing a GUI with a color fading effect. During the process, the GUI display system 100 may seamlessly and successively change from a color code that corresponds to the first color to one that corresponds to the second color, in an interval that is imperceptible to the human eye.

As described above, the GUI display system and method according to the invention applies color codes to a chroma key image and combines a few effect images with the chroma key image, thereby providing GUIs with a variety of colors and effects to enhance user experience.

In addition, the GUI display system and method according to the invention uses a relatively small amount of image resources to provide a set of GUIs, thereby requiring a relatively small amount of memory, enhancing the speed of implementing GUI, and providing a GUI with a variety of effects.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A graphic user interface (GUI) display method comprising:
   loading a chroma key image of a specific shape for a GUI;
   applying a color code corresponding to the GUI to the chroma key image;
   creating a GUI image by combining an effect image corresponding to the GUI with the chroma key image to which the color code is applied by arranging an image effect layer on a chroma key layer;
   after creating the GUI image, removing the chroma key image; and
   after removing the chroma key image, displaying the created GUI image, and in response to altering at least one of the color code or the effect images, altering a state of the GUI without loading a new GUI image.

2. The method of claim 1, wherein the GUI comprises:
   at least one of a dial image, a keyboard, an icon, a control button, a scroll bar and an indicator bar.

3. The method of claim 1, wherein the color code comprises:
   at least one of RGB values, a hex code, or a code corresponding to one of the colors of a palette.

4. The method of claim 1, wherein the state of the GUI includes
   at least one of a normal state, a pressed state, a selected state, a highlighted state, an active state, and an inactive state.

5. The method of claim 1, wherein the effect image corresponds to at least one of a texture effect and a cubic effect.

6. The method of claim 1, further comprising:
   successively varying the color codes and applying the successively varied color codes to the image iteratively in response to detecting each lapse of a preset time interval; and
   displaying the GUI image based on the successively varied color codes.

7. The method of claim 1, further comprising:
   detecting an input to the GUI; and
   determining at least one of the color code and the effect image according to the input.

8. The method of claim 7, wherein loading the chroma key image comprises:
   determining the GUI corresponding to the input; and
   loading the chroma key image for the GUI.

9. The method of claim 7, further comprising:
   successively varying the color codes according to the input and applying them gradually to the image; and
   displaying the GUI image based on the successively varied color codes.

10. A graphic user interface (GUI) display apparatus comprising:
- a display unit which displays one or more GUIs; and
- a controller comprising at least one processor having circuitry configured to:
- load a chroma key image of a specific shape for the GUI;
- apply a color code corresponding to the GUI to the chroma key image;
- create a GUI image by combining an effect image corresponding to the GUI with the chroma key image to which the color code is applied by arranging an image effect layer on a chroma key layer;
- after creating the GUI image, remove the chroma key image; and
- after removing the chroma key image control the display unit to display the GUI image, and in response to an altering of at least one of the color code or the effect image, alter a state of the GUI without loading a new GUI image.

11. The apparatus of claim 10, wherein the GUI comprises:
- at least one of a dial image, a keyboard, an icon, a control button, a scroll bar and an indicator bar.

12. The apparatus of claim 10, wherein the color code comprises:
- at least one of RGB values, a hex code, or a code corresponding to one of the colors of a palette.

13. The apparatus of claim 10, wherein the effect image corresponds to state of the GUI, includes at least one of a normal state, a pressed state, a selected state, a highlighted state, an active state, and an inactive state.

14. The apparatus of claim 10, wherein the effect image corresponds to at least one of a texture effect and a cubic effect according to shadow.

15. The apparatus of claim 10, wherein the controller successively varies the color codes and applies the successively varied color codes to the image iteratively in response to detecting each lapse of a preset time interval, and controls the display unit to display the GUI image according to the successively varied color codes.

16. The apparatus of claim 10, further comprising:
- an input unit for receiving an input to the GUI,
- wherein the controller is configured to determine at least one of the color code and the effect image according to the input.

17. The apparatus of claim 16, wherein the controller is configured to determine the GUI corresponding to the input, and loads the chroma key image for the GUI.

18. A graphic user interface (GUI) display method comprising:
- detecting an input to a displayed GUI;
- determining a color code and an effect image of the GUI according to the input;
- recreating the GUI by applying the determined color code to a chroma key image corresponding to the GUI and combining the determined effect image to the chroma key;
- after creating the GUI image, removing the chroma key image; and
- after removing the chroma key image, displaying the recreated GUI,
- wherein in response to altering at least one of the color code or the effect images, a state of the recreated GUI is altered without loading a new GUI image.

19. The method of claim 18, further comprising:
- determining at least one color code;
- repeatedly recreating the GUI by applying the at least one color code; and
- repeatedly displaying the recreated GUI.

20. The method of claim 18, further comprising:
- loading a chroma key image of a specific shape for the GUI;
- applying a color code corresponding to the GUI to the chroma key image;
- creating the GUI by combining an effect image corresponding to the GUI with the chroma key image to which the color code is applied; and
- displaying the GUI.

* * * * *